United States Patent
Gaul

[11] 3,809,331
[45] May 7, 1974

[54] ELECTRIC CORD COILER

[75] Inventor: Robert G. Gaul, Altamonte, Fla.

[73] Assignee: Paragon Wire & Cable Corp., Longwood, Fla.

[22] Filed: June 28, 1972

[21] Appl. No.: 267,244

[52] U.S. Cl. .............................. 242/100.1, 24/71.2
[51] Int. Cl. ............................................ B65h 75/38
[58] Field of Search ............ 242/100.1, 86.1, 107.1; 24/71.2

[56] References Cited
UNITED STATES PATENTS

| 3,208,121 | 9/1965 | Price | 242/100.1 X |
| 1,186,131 | 6/1961 | Replogle | 242/100.1 |
| 2,952,420 | 9/1960 | Von Hoorn | 242/100.1 |
| 3,529,786 | 9/1970 | Holden | 242/100.1 |

Primary Examiner—John W. Huckert
Assistant Examiner—Edward J. McCarty

[57] ABSTRACT

An electric cord coiler comprising a hub member journaled on the spaced end walls of a hollow housing and carrying a partition preferably in the form of an annular plate to partition the interior of the housing into two axially separated spaces, these spaces being joined by a diametrical passage in the hub member so that a portion of an electric cord intermediate its ends can be placed in such passage and the contiguous portions of the cord at opposite ends of such intermediate portion can be wound around the hub on opposite sides of the partition with the extreme outer end portions of the cord extending outwardly through openings in the side wall of the housing. The effective length of the electric cord from extremity to extremity can be changed by either unwinding some of the cord from the hub member or winding more thereon. The coiler is characterized by its simplicity, its minimum number of different parts, its ease of manufacture and its ready assembly.

10 Claims, 8 Drawing Figures

PATENTED MAY 7 1974
3,809,331
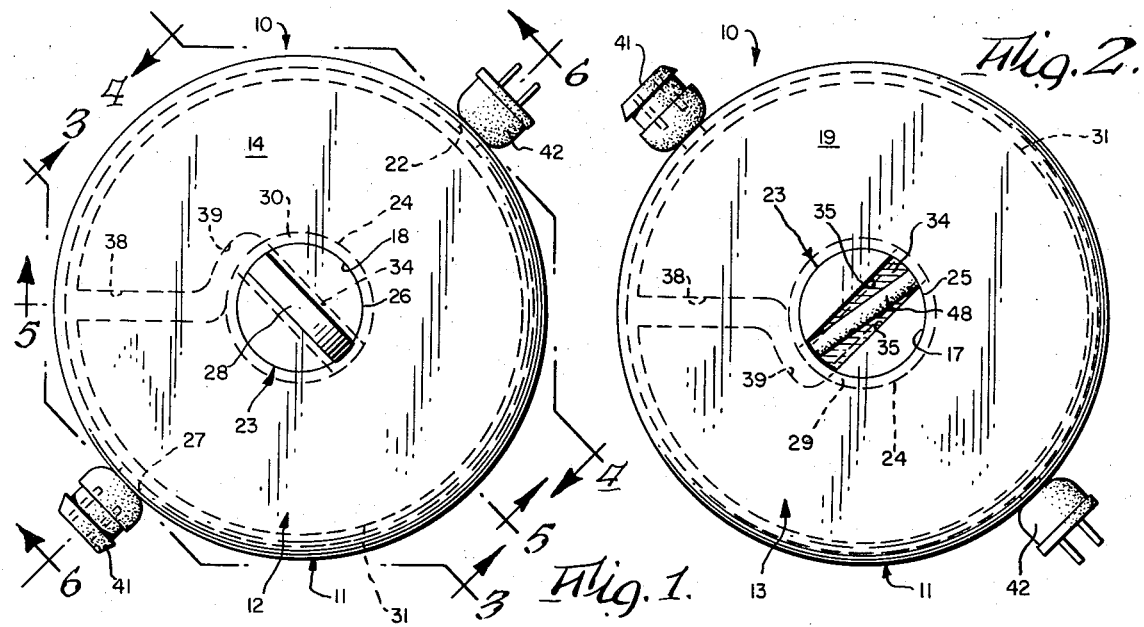
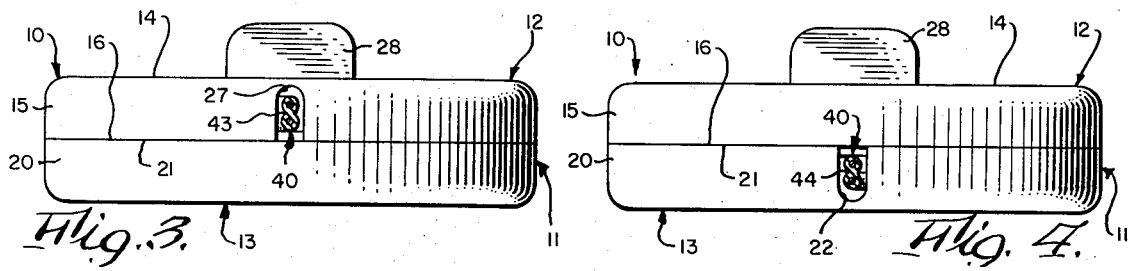
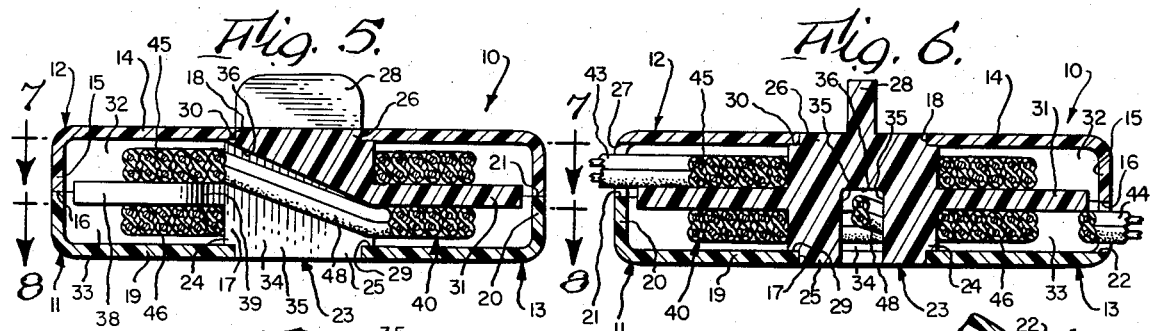
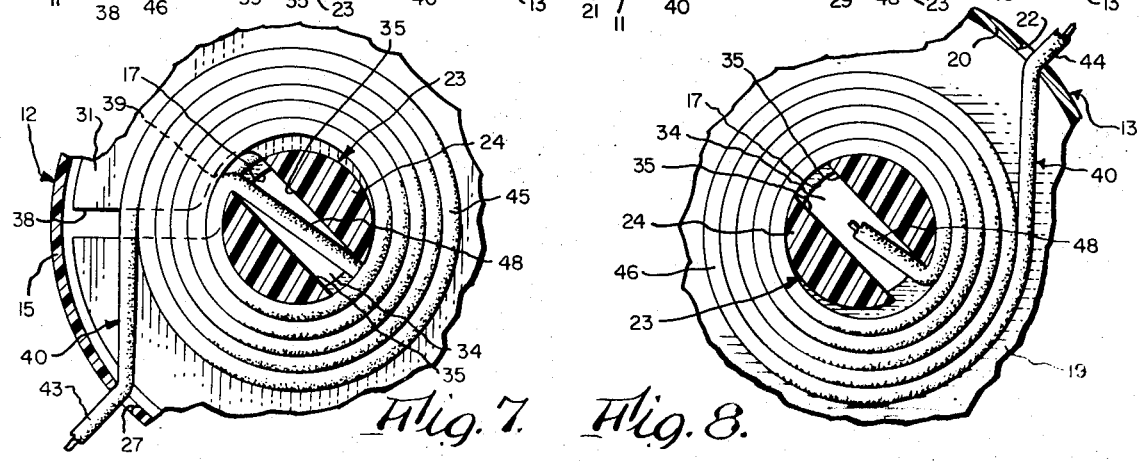

ELECTRIC CORD COILER

BACKGROUND OF THE INVENTION

It is known to provide an electric cord coiler in which a length of an electric cord is wound upon a shaft member so that the end portions can be lengthened or shortened. Such prior art coilers have been relatively complicated in construction, difficult to assemble and to maintain in assembled condition, all of which has lead to an expensive device and one not fully satisfactory.

SUMMARY OF THE INVENTION

The primary object of the present invention is to provide an electric cord coiler superior to the prior art coilers in that the inventive coiler is exceedingly simple in construction, involves a minimum of different parts, each of which is easy to manufacture and preferably composed of a molded plastic material, which employs duplicates of one part in order to minimize the number of different parts, which is simple to manufacture and assemble and hence relatively inexpensive.

As with the prior art cord coilers, the purpose of the device is to take up the slack in a length of electric cord between an appliance which operates on electric power such as a lamp and a source of electric power such as a wall outlet, but yet have additional length of electric cord available should the appliance be relocated where a longer length of electric cord would be required. The electric cord coiler of the present invention provides a convenient device for storing unneeded length of electric cord intermediate the ends of such cord which are connected to a source of electric power at one end and at its opposite end to an apparatus which operates on the power supplied through the cord.

In accordance with the present invention, an electric cord coiler is provided comprising a hollow housing including spaced end walls and an interconnecting side wall provided with spaced openings, a hub member arranged within said housing and journaled on said end walls, a partition fixed to said hub member and extending outwardly therefrom intermediate the ends thereof and partitioning the interior of the housing into two axially separated spaces, passage means extending diametrically across said hub member and establishing communication between said spaces, an electric cord having outer end portions, inner portions and an intermediate portion between said inner portions, said intermediate cord portion being arranged in said passage means, said inner cord portions severally being wound on said hub member on opposite axial sides of said partition so that one of said inner cord portions occupies one of said spaces and the other of said inner cord portions occupies the other of said spaces, said outer cord end portions severally extending outwardly from said housing through said openings, and means external of said housing and connected to said hub member for turning the same.

Other objects and advantages of the present invention will be apparent from the following detailed description of a preferred embodiment illustrated in the accompanying drawing.

BRIEF DESCRIPTION OF DRAWING FIGURES

FIG. 1 is a top plan view of an electric cord coiler constructed in accordance with principles of the present invention.

FIG. 2 is a bottom elevational view of the electric cord coiler shown in FIG. 1.

FIG. 3 is a vertical sectional view thereof taken on line 3—3 of FIG. 1, and showing the housing part of the coiler in side elevation, and in cross section only the terminal end portion of the electric cord leaving an opening in such housing.

FIG. 4 is a view similar to FIG. 3 but taken on line 4—4 of FIG. 1.

FIG. 5 is a vertical multiplanar sectional view of the coiler, taken generally on line 5—5 of FIG. 1.

FIG. 6 is a vertical central transverse uniplanar sectional view thereof, taken on line 6—6 of FIG. 1.

FIG. 7 is a fragmentary horizontal sectional view of the coiler, taken on line 7—7 of FIG. 5.

FIG. 8 is another fragmentary horizontal sectional view thereof, but at a lower elevation, this view being taken on line 8—8 of FIG. 5.

DESCRIPTION OF THE PREFERRED EMBODIMENT

The electric cord coiler embodying the present invention and illustrated in the accompanying drawing is represented by the general numeral 10. This coiler is shown as comprising a hollow housing 11 including an upper cup-shaped housing section 12 and a lower cup-shaped housing section 13. Section 12 comprises a flat disk-like horizontal end wall 14 having an integral downturned annular flange 15 terminating in a uniplanar rim 16. Centrally, end wall 14 is shown as having a vertical cylindrical opening 18 therethrough.

Lower housing section 13 similarly has a flat disk-like horizontal end wall 19 from the edge of which extends upwardly an annular flange 20, terminating in a uniplanar rim 21 adapted to abut rim 16. End wall 19 has a central vertical cylindrical through hole 17 which is the same size as and registers with opening 18.

Flange 15 of upper housing section 12 is shown as having a U-shaped recess in the rim 16 so as to provide jointly with that portion of opposing rim 21 which bridges across such recess an enclosed opening 27. Similarly lower housing section 13 has a recess which jointly with rim 16 provides an enclosed opening 22.

The housing sections 12 and 13 are preferably duplicates of each other, one being inverted with respect to the other when assembled. The joined flanges 15 and 20 provide an annular side wall for the housing 11. Their opposing and abutting rims 16 and 21 can be suitably joined together to prevent axial separation of these housing sections and to prevent relative circumferential movement therebetween. Preferably, as shown, the openings 27 and 22 are arranged on diametrically opposite sides of the housing. These housing sections are preferably molded of a suitable plastic material and a suitable cement or adhesive is utilized to join or bond the opposing rims 16 and 21 together.

The inventive coiler is also shown as comprising a hub member represented generally by the numeral 23 principally arranged within the housing and journaled on end walls 14 and 19. This hub member is shown as comprising a cylindrical intermediate section 24 having a reduced cylindrical neck section 25 at its lower end and a similar reduced cylindrical neck section 26 at its upper end. Rising from neck section 26 is a blade-shaped fingerpiece 28 which has a transverse dimension no greater than the diameter of neck portion 26.

The base of lower neck section 25 has an annular downwardly facing shoulder 29 which engages the inner or upper surface of lower wall 19 of lower housing section 13. Similarly, the base of upper neck section 26 has an annular shoulder 30 but this shoulder faces upwardly and bears against the inner or lower surface of upper wall 14 of upper housing section 12. The engagements of these neck portions in the respective openings 17 and 18 is frictional so that some resistance is offered to turning of hub member 23 by manipulating fingerpiece 28, or by pulling out one or both ends of the electric cord causing the hub member to turn.

Intermediate the ends of the center portion 24 of the hub member 23, the same is shown as provided with an outwardly extending flat annular plate portion 31, preferably formed integrally therewith. This plate 31 acts as a partition to divide the interior of the hollow housing 11 into an upper space 32 and a lower axially separated space 33.

Hub member 23 is also shown as provided with a groove 34 which opens to the lower face of this hub member and has parallel and laterally spaced vertical side walls 35 joined at their inner end by inclined bottom wall 36. The inclination of this wall 36 is such that it establishes communication with upper space 32 on one side of the hub member and with lower space 33 at the diametrically opposite side of the hub member.

The plate-like partition 31 is shown as having a slot 38 extending axially therethrough from its upper surface to its lower surface. Essentially this slot 38 is radial in direction as it leads from the outer periphery of partition 31, but adjacent its inner end this slot 38 has a bend in it as indicated at 39 the inner end of which communicates with the deep end of groove 34 adjacent the high end of bottom wall 36 for this groove.

The electric cord represented generally by the numeral 40 is shown as being a length of conventional two-conductor insulated electric cord, each conductor being embedded in a surrounding sheath of insulation, with one end of the cord being suitably electrically connected to a receptacle 41 and the opposite end of this cord being suitably electrically connected to a plug 42. The length of electric cord includes outer end portions 43 and 44 adjacent receptacle 41 and plug 42, respectively; also includes inner portions one of which is indicated at 45 and the other of which is indicated at 46; and an intermediate portion 48 between these inner portions 45 and 46.

Hub member 23 with its plate-like partition 31 and finger piece 28 is preferably formed as a single part and composed of a suitable molded plastic material.

When assembling the electric cord coiler of the present invention, the various primary parts such as the upper housing section 12, the lower housing section 13, the integrated hub member 23 with its partition 31 and fingerpiece 28, as well as the electric cord 40, are separate parts or elements, disassembled from one another. In order to assemble them, the electric cord is placed so that its intermediate portion 48 lies in the bottom of inverted groove 34. Inner cord portion 45 may then be wound around the portion of the center part of hub member 23 immediately above partition plate 31, being wound in a counterclockwise direction as depicted in FIG. 7. Similarly, the inner cord portion 46 is wound around the center part of hub member 23 below partition plate 31, again in a counterclockwise direction as depicted in FIG. 8. The hub member 23 with the convolutions of electric cord thereon is then assembled with respect to housing sections 12 and 13 by inserting fingerpiece 28 through opening 18 until shoulder 30 engages wall 14, and by placing lower housing section 13 over lower neck 25 so that the shoulder 29 at the base of this neck engages the inner surface of the lower housing section end wall 19. During this assembly, the end portions 43 and 44 of the electric cord are placed in the recesses in the housing section flanges 15 and 20 so that when the housing sections are joined together these cord end portions extend severally outwardly through openings 27 and 22.

With the application of suitable adhesive to the opposing end faces of rims 16 and 21, the housing sections are joined together in the desired annular and axial orientation. That is, the openings 27 and 22 are disposed substantially diametrically on opposite sides of the housing.

The purpose of slot 38 is to facilitate placement of the electric cord in groove 34. For example, the center portion 48 of the cord is placed in the groove 34 near its shallow end and its deeper end which is adjacent the inner end 39 of slot 38, the cord is bent sufficiently to assume the configuration of slot 38, 39 so that the cord can be positioned above partition plate 31. If slot 38 extended outwardly from the deep end of groove 34, difficulty might be experienced in maintaining the cord on the upper side of partition plate 31 during winding of the cord about the hub member.

In use, as cord is desired, either the receptacle 41 or plug 42 is pulled manually outwardly away from the coiler so as to rotate hub member 23 relative to the housing, or the fingerpiece 28 is turned manually in a counterclockwise direction as viewed in FIG. 1. This unwinds the upper and lower coils of cord to allow the unwound portions to leave through the respective openings 27 and 22, thereby increasing the effective length of the cord from plug to receptacle.

If the electric cord is to be shortened in effective length the housing 11 can be grasped in one hand and with his other hand the operator can turn fingerpiece 28 in a clockwise direction. This will pull more cord in through opening 27 and 22 and winding upon hub member 23.

The turning of hub member 23 relative to housing 11 is somewhat frictional so as to prevent freely spinning relative rotation between these elements.

What is claimed is:

1. An electric cord coiler comprising a hollow housing including spaced end walls and an interconnecting side wall provided with spaced openings, a hub member arranged within said housing and journaled on said end walls, a partition fixed to said hub member and extending outwardly therefrom intermediate the ends thereof and partitioning the interior of said housing into two axially separated spaces, passage means extending diametrically across said hub member and establishing communication between said spaces, an electric cord having outer end portions, inner portions and an intermediate portion between said inner portions, said intermediate cord portion being arranged in said passage means, said inner cord portions severally being wound around said hub member on opposite axial sides of said partition so that one of said inner cord portions occupies one of said spaces and the other of said inner cord portions occupies the other of said spaces, said outer cord end portions severally extending outwardly from said housing through said openings, and means external of said housing and connected to said hub member for turning the same.

2. An electric cord coiler according to claim 1 wherein said partition is an annular plate having a slot extending axially therethrough and at one end communicating with one end of said passage means and at its other end opening to the periphery of said plate.

3. An electric cord coiler according to claim 2 wherein said slot is not straight for its full length.

4. An electric cord coiler according to claim 3 wherein said slot has a bend in it adjacent said one end of said passage means.

5. An electric cord coiler according to claim 1 wherein said housing comprises a pair of cup-shaped sections severally having uniplanar rims which abut each other and joined to prevent axial separation and relative circumferential movement.

6. An electric cord coiler according to claim 4 wherein said housing comprises a pair of cup-shaped sections severally having uniplanar rims which abut each other and joined to prevent axial separation and relative circumferential movement, one of said openings being provided by a recess in one of said rims and the other of said openings being provided by a recess in the other of said rims.

7. An electric cord coiler according to claim 5 wherein said sections severally have end walls parallel to each other and provided with registered openings, and said hub member has a reduced neck portion at each end arranged in the corresponding one of said registered openings and an annular shoulder at the base of said neck portion which abuts the inside surface of the corresponding one of said end walls.

8. An electric cord coiler according to claim 7 wherein said passage means comprises a groove recessed in one end of said hub member, and said means for turning said hub member comprises a fingerpiece having a transverse dimension no greater than that of that one of said neck portions from which it extends.

9. An electric cord coiler according to claim 8 which consists of four parts including said housing sections as two parts, said cord as a third part, and said hub member, partition and fingerpiece collectively as a fourth part, the coiler being assembled by inserting said fingerpiece through one of said registered openings from the inside of the corresponding end wall having such one opening and placing the other end wall on the said neck portion at the opposite end of the hub member to bring said rims into abutting relationship, said registered openings receiving said neck portions.

10. An electric cord coiler according to claim 9 wherein said housing sections are duplicates of each other, and they and said third and fourth parts are severally composed of a molded plastic material.

* * * * *